Inventors:
D. W. Righton &
R. J. Treadwell
By: Moore & Hall
Attorneys.

INVENTORS:
D.W. RIGHTON &
R.J. TREADWELL
BY: Moore & Hall
ATTORNEYS.

Nov. 10, 1964 D. W. RIGHTON ETAL 3,156,855

SERVO SYSTEMS HAVING A PLURALITY OF INDEPENDENT SUB-CHANNELS ARRANGED TO ACTUATE A COMMON OUTPUT

Filed Dec. 20, 1961 4 Sheets-Sheet 3

INVENTORS;
D. W. RIGHTON &
R. J. TREADWELL
BY:
Morse & Hall
ATTORNEYS.

INVENTORS:
D. W. RIGHTON &
R. J. TREADWELL
BY: Moore & Hall
ATTORNEYS.

3,156,855

SERVO SYSTEMS HAVING A PLURALITY OF INDEPENDENT SUB-CHANNELS ARRANGED TO ACTUATE A COMMON OUTPUT

David William Righton and Richard Julian Treadwell, Cheltenham, England, assignors to S. Smith & Sons (England) Limited, London, England, a British company Filed Dec. 20, 1961, Ser. No. 160,796
Claims priority, application Great Britain, Dec. 21, 1960, 43,844/60
22 Claims. (Cl. 318—19)

Figure 1:
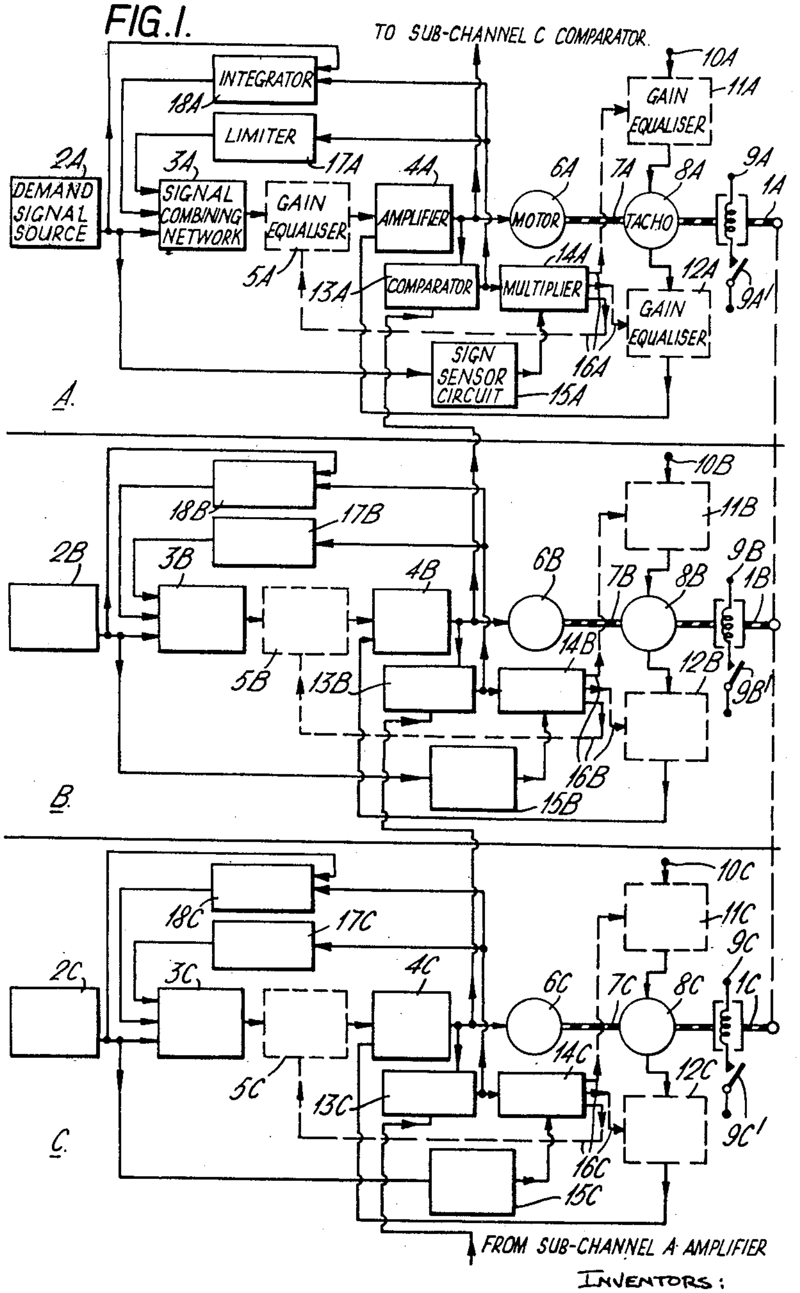

The present invention relates to servo systems of the kind (hereinafter referred to as the kind specified) in which a plurality of independent sub-channels are arranged to actuate a common output in dependence upon a common demand quantity.

In a typical case, servo systems of the kind specified may include for each sub-channel, a demand signal source for generating a signal representing the demand quantity, a servo amplifier to the input of which the demand signal source is coupled, a servo motor which is energized in operation by the output of amplifier and which is coupled to a common output with the servo motors of the other sub-channels, and a feed back signal generator coupled to the output shaft of the motor for feeding back to the input of the amplifier a signal dependent upon the output of the sub-channel. In each sub-channel, corresponding items are nominally identical at least as regards their operating characteristics, each sub channel therefore receiving signals representing a common demand quantity.

In a system of the kind specified, some provision must be made to prevent malfunctioning or damage if the output of any one sub-channel disagrees significantly with the outputs of the remainder, as may happen, for example, if there is a fault in any one of the sub-channels. To this end, some means may be provided for disconnecting the drive from any one of the motors to the output member if the torque exerted by that drive exceeds a pre-determined value. Provision may also be made for disconnecting any sub-channel in which one or more other predetermined fault conditions arise.

Further, reasonable and permissible differences in the signals (including reasonable and permissible datum drifts in the outputs of signal sources) produced by the demand signal sources or the feed back signal generators or in the operating characteristics of the servo amplifier or other elements of the sub-channels, may, unless corrected, give rise to differences in the motor output torques sufficient to result in one or more of the sub-channels being put out of operation unnecessarily. It is, therefore, an object of the present invention to provide a system of the kind specified in which the effects of reasonable and permissible differences are substantially balanced or equalized between the sub-channels so as to prevent this happening.

According to the present invention a servo system of the kind specified is provided, in each sub-channel, with means for comparing the output of the servo amplifier with that of the next of the sub-channels, considering the sub-channels in a pre-determined cyclic order, and means for varying the transmission characteristics of the sub-channel in dependence upon the difference between said outputs in a sense such as to reduce the difference towards zero, together with means for preventing a simultaneous drift of the outputs of all the sub-channels together in the same manner.

The means for varying the transmission characteristics of a sub-channel may include means for varying the gain of the sub-channel, for example by varying the gain of a pre-amplifier through which signals are applied to an input of a main amplifier, by varying the gain of a feed back channel or the sensitivity (i.e. the signal amplitude for a given output) of the feed back signal generator. In addition or alternatively, the means for varying the transmission characteristics may include means for feeding back to the amplifier one or more signals representing said difference, either to the input or to an intermediate stage of the amplifier, in such a sense as to reduce any difference towards zero. Such feed back means may include means for feeding back a signal representing the integral with respect to time of the difference and/or means for feeding back a signal representing the difference, either feed back signal, if provided, being subject to limitation to prevent it exceeding a predetermined amplitude in either sense.

The means for preventing a simultaneous drift in all the sub-channels may include, in each sub-channel, means for feeding a signal representing the integral with respect to time of the demand signal, or components thereof, to the input of the amplifier, said means including means for limiting the amplitude of the integral signal to within a predetermined range. Where the means for varying the transmission characteristics of a sub-channel includes means for feeding back a signal representing the integral of the difference, the integrator which forms part of the said means, may be fed in addition with the demand signal or components thereof and thus in addition constitute part of said means for preventing simultaneous drift of all the sub-channels.

Figure 2:
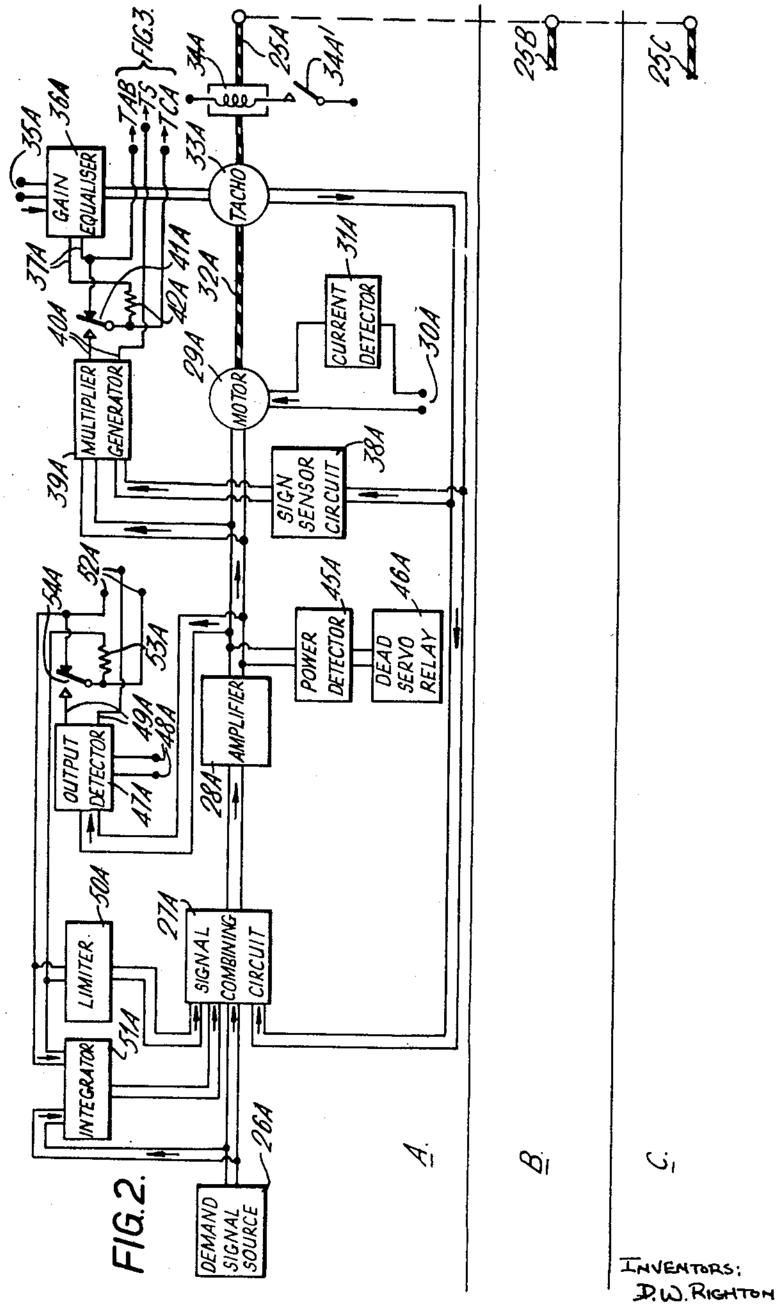
Figure 3:
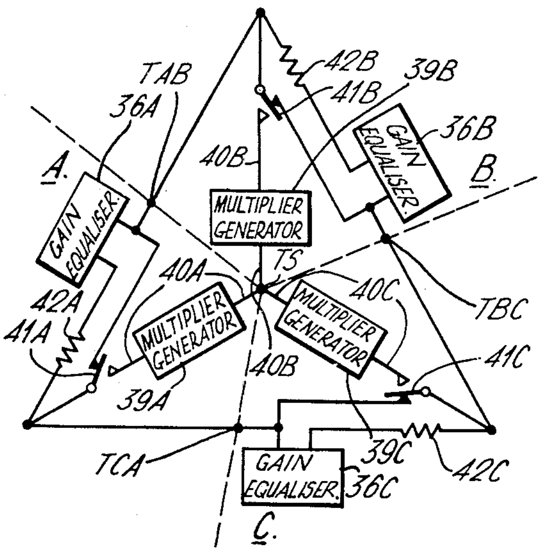
Figure 4:
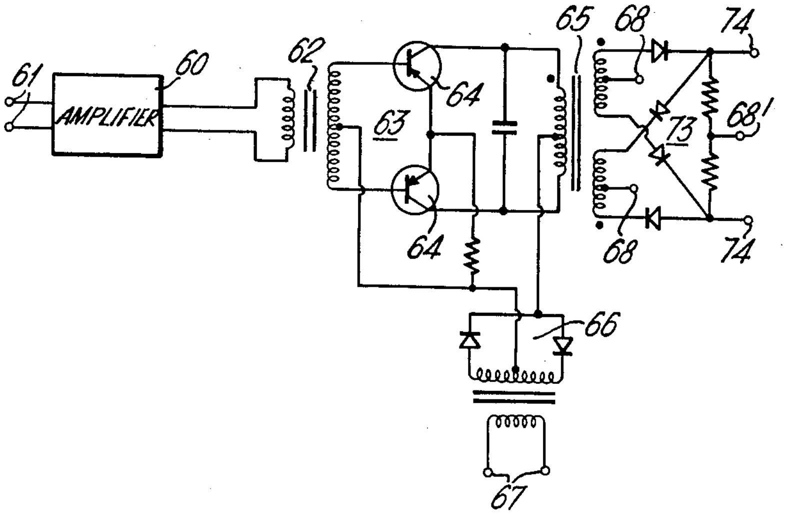
Figure 4A:
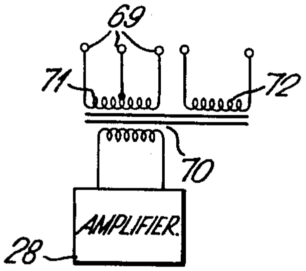

Examples of servo systems according to the present invention will now be described with reference to the accompanying drawings in which:

FIGURE 1 shows a block circuit diagram of a basic system according to the present invention, FIGURE 2 shows a block circuit diagram of a particular system according to the invention in which for convenience of design the principle of operation is slightly modified, and FIGS. 3, 4 and 4*a* show circuits forming parts of FIG. 2.

Referring now to FIGURE 1 of the accompanying drawings, there is shown a block circuit diagram of a servo system which forms one channel of an autopilot system for an aircraft, for example the elevator channel, and has three sub-channels which respond to a common demand quantity and actuate a common output. The particular autopilot system to be described is of the type known as a "rate/rate" system in each sub-channel of which a separate demand signal is generated representing the rate of movement of the control surfaces required to overcome any disturbances of the aircraft's flight condition and/or to fly the aircraft along a required path. The signal sources are nominally identical in the three sub-channels which are thus provided with signals representing a common demand quantity. It will be appreciated, however, that the present invention is equally applicable to other types of autopilot servo systems, for example position control systems, and also to servo systems other than autopilots. Similar systems, each including two or more sub-channels, will of course usually be provided for the other control surfaces e.g. the ailerons and the rudder, of an aircraft.

The three sub-channels A, B and C of the system are shown in separate sections in FIGURE 1, the sections being given the corresponding references A, B and C. The three output members 1A–C of the sub-channels A–C are coupled to a common output as indicated by the dotted connection linking the output members 1A–C. The common output member may for example be a shaft carrying a pinion which is driven at different points on its periphery by pinions mounted on the shafts 1A–C. As each of the sub-channels A–C includes identical constituent elements, these are given the same numerical reference for each sub-channel with an appropriate affix A, B or C. Where, in this description, all the identical elements of the three sub-channels are referred to simultaneously the appropriate numerical reference will be used alone.

Each of the sub-channels A–C includes a demand signal source 2 which is nominally identical with those of the other sub-channels but is independent from them. In certain circumstances it may be permissible to employ a single signal source 2 common to all the sub-channels, or alternatively certain components of the signal may be derived from a common source provided adequate steps are taken to ensure that the effects of a failure of the common source can be tolerated by the system as a whole.

As the system is a "rate/rate" system, the signals generated by the signal sources 2 will represent a demanded rate of elevator movement. In the known manner each may include a combination of rate gyroscopes, position monitors and other sources of signals, for example radio beam receivers, for generating a composite demand signal for controlling the aircraft's elevators either to maintain a given flight condition or to fly along a selected flight path. The sources 2 may also include in known manner means for including in the demand signals suitable proportions of signals which are the derivative or the integral with respect to time of a generated signal.

The outputs of the demand signal sources 2 are applied to inputs of signal combining networks 3 in which the demand signals are combined with various feed back signals in the manner to be described below. The output of the signal combining networks 3 are applied to amplifiers 4 through associated gain equalisers 5. There are various places where gain equalisers may be included in the circuit of each sub-channel, as will be described below, and three of these have been shown by way of example in dotted outline in FIGURE 1. Usually only one of the three alternatives will be employed in a given system. The outputs of the amplifiers 4 are applied to servo motors 6, the output shafts 7 of which drive tachometer generators 8 and the input members of electromagneic clutches 9. The output members of the clutches 9 are coupled directly to the output members 1 which are coupled together to the common output for the channel. These couplings each include some form of torque responsive device (which is not shown but may be, for example, as described in British patent specification No. 929,761) which is arranged to actuate a relay (hereinafter referred to as a clutch relay) which opens an electric switch contact 9′ if the torque transmitted exceeds a predetermined value. The torque responsive device may for example operate switch contacts included in the energising circuit of the clutch relay and arranged to be closed and thus to connect the relay winding across a source of energising voltage.

The contacts 9′ are connected in the energising circuits of the coils of the clutches 9 so that the clutches 9 are disengaged if the contact 9′ opens. Thus, if the output of any one sub-channel disagrees significantly with those of the other two, the torque responsive device of that sub-channel will operate to disengage the clutch and put the channel out of action. Other devices, for example circuits in the sub-channels responsive to various fault conditions, may also cause actuation of the clutch relays to disengage the output of any faulty sub-channel. The clutch circuits may be interconnected in the manner described in copending U.S. application Serial No. 81,529, filed by R. J. Treadwell on January 9, 1961, and relating to Electric Switching Circuits, so that the channel will continue to operate with only two operative sub-channels but that, if then a further fault condition arises, both remaining sub-channels are disengaged.

In known manner, the tachometer generators 8 require the application of a reference voltage in order that they may generate signals representing the speeds of rotation of the output shafts 7 of the motors 6. The reference voltages are applied to terminals 10 which are shown connected to the tachometer generators 8 through gain equalisers 11. The output signals from the tachometer generators 8 are shown as being fed back to further inputs of the amplifiers 4 through gain equalisers 12.

As mentioned previously only one of the three gain equalisers 5, 11 and 12 will usually be included in each of the sub-channels of a given system, the same one in each sub-channel. Whichever one it is, is controlled in accordance with the difference between the output voltage of the amplifier 4 of the sub-channel to which it belongs and the output of the next one of the three subchannels (considering them in a predetermined cyclic order for example in the order A, B, C) and the sign of the input voltage to the sub-channel to control the transmission characteristics of the sub-channel by varying its gain in such a manner as to tend to reduce the difference between the two amplifier output voltages towards zero. To this end, considering sub-channel A, the output of amplifier 4A is applied to a comparator 13A together with the output from amplifier 4B. (In sub-channel B the comparator 13B has the outputs of amplifiers 4B and 4C applied to it and in sub-channel C the comparator 13C has the outputs of amplifiers 4C and 4A applied to it.) The output of the comparator 13A (this must be sign sensitive, that is to say the output equals, say, the output of amplifier 4A minus the output of amplifier 4B and will vary in sign according to the sign of the difference) is applied to a multiplier circuit 14A to which is also applied the output of a sign sensor circuit 15A. The input signal for sub-channel A, that is the output of signal source 2A, is applied to the input of the sign sensor circuit 15A, which operates to produce one of two different output signals (or signal conditions) in dependence upon the sign of the input signal. The output of the multiplier circuit 14A is thus a signal representing the difference, having regard to both magnitude and sign, between the output voltages of amplifiers 4A and 4B multiplied by the sign of the input to sub-channel A. This output is applied as indicated by the three dotted connections 16A to which ever one of the gain equalisers 5A, 11A or 12A is used in the particular system. It will be appreciated that gain equalisers may also be included in other places than those shown, for example between the sources 2 and the networks 3 or they may be associated in some other way with the sources 2 so as to vary the sensitivity thereof, for example by varying the magnitude of a reference voltage.

If the gain equalisers 5 are employed, the magnitude of the signals applied from them to the amplifiers 4 is varied in such a sense as to tend to reduce the difference between the output voltage of the amplifier 4 concerned and the output voltage of the amplifier for the subchannel with which it is compared. If the gain equalisers 11 are employed, the magnitudes of the feed back signals generated by the tachometer generators 8 are varied to this same end by varying the magnitude of the reference voltages supplied to the generators 8 from the sources connected to terminals 10. Again, if the gain equalisers 12 are employed, the amplitudes of the feed back signals from the tachometer generators 8 are varied for this same purpose. In the case of the gain equalisers 12 it will be appreciated that they may form part of the signal combining networks 3.

Variation of the gains of the sub-channels in any of the above ways, will enable the outputs to be equalised, thus preventing unnecessary cut outs, in the event that there are reasonable and permissible differences in, for example, the amplitudes of the feed back signals, or the amplitudes of the signals from the sources 2. Further differences in the outputs of the three sub-channels may, however, be caused by reasonable and permissible datum drifts or errors in the outputs of for example the signal sources 2 or the tachometer generators 8 (or other feed back signal sources on other types of servo systems) and these may be balanced by feeding back signals dependent on the outputs of the comparators 13 (i.e. on the differences between the outputs of the two sub-channels concerned) to the inputs of the sub-channels through suitable feed back networks in such a manner as to tend to reduce the outputs of the comparators 13 towards zero.

In the system shown in FIGURE 1, the outputs of the comparators 13 are fed back directly to further inputs of the combining networks 3 through limiters 17, this feed back path being provided to permit balancing of any short term drifts or errors which may arise, for example on switching from one source to another within the demand signal sources 2. Such drifts will be partially compensated by the action of the gain equalisers but this additional compensation, with suitably limited effect, is desirable to prevent unnecessary cut outs. To balance long term drifts, for example slowly accumulating errors due to long term changes in the operating characteristics of circuit elements, the outputs of the comparators 13 are fed back to other inputs of the combining networks 3 through integrators 18 the outputs of which may be subject to limitation. In both cases, the sense of the feed back signals is such as to tend to reduce the outputs of the comparators 13 towards zero.

Finally, to prevent the possibility that all three sub-channels should drift simultaneously in the same manner, since the outputs of all three comparators 13 would remain substantially zero during a simultaneous drift in the same sense, the outputs of the demand signal sources 2 are fed to the inputs of the integrators 18 together with the outputs of the comparators 13. Alternatively selected components of the signals from the sources 2 may be fed to the integrators 18.

The integrators 18 will need to be electro-mechanical rather than electronic integrators since it will be necessary that their outputs should be stored indefinitely even though the sub-channels to which they belong are switched off or dis-engaged. In known manner, therefore, the integrators 18 may each include a servo amplifier, a servo motor and a tachometer generator coupled to the output shaft of the motor. The signals to be integrated are fed to the input of the amplifier together with, but in opposition to, the output of the tachometer generator. The output of the integrator is represented by the position of the shaft of the motor and this is converted to an electrical signal by a suitable pick off device responsive to the angular position of the shaft or a potentiometer driven by the shaft through a suitable linkage.

In the above description no reference has been made to the nature of the signals and it will be appreciated that they may be of any desired form for example D.C. signals or modulated A.C. signals. In the latter case the circuit will require the addition of modulators, demodulators, reference voltage supplies and other features in known manner and similar additions may be required in other cases. Where reference has been made to the sign of a signal, in the case of A.C. signals this will of course be determined by the phase, a reversal of phase corresponding to a change of sign.

In an automatic pilot, a high degree of safety in operation is a necessity. Each of the sub-channels may, therefore, incorporate besides the torque responsive device, various other devices for detecting fault conditions arising in the sub-channel. These further devices may, for example, actuate the clutch relays to open the contacts 9′ so as to dis-engage the clutch 9 of any sub-channel in which a certain fault arises. In addition, when a sub-channel has been disconnected some rearrangement is necessary in order that the amplifier output of the faulty sub-channel shall not be applied to the comparators of the other two sub-channels which remain in operation. This can be effected by switching the inputs to the comparators under the control of the clutch relays.

In producing a system incorporating a plurality of sub-channels for use, for example in an autopilot, it may be desirable that each sub-channel shall be as self contained as possible and that the number of interconnections between the sub-channels shall be kept to a minimum. The circuit of a particular system in accordance with the invention in which this has been done as far as possible is shown in FIGURE 2 of the accompanying drawings.

In the system shown in FIGURE 1, the gain of one of the sub-channels, for example sub-channel A, may be expressed by the following equation:

$$G_A = 1 + k(V_{OA} \times \text{sign} V_{FA} - V_{OB} \times \text{sign} V_{FB}) \quad (3)$$

Where $G_A$ is the gain, $k$ is a constant, $V_{OA}$ and $V_{OB}$ are the output voltages of sub-channels A and B and $V_{IA}$ is the input voltage to sub-channel A.

In the system shown in FIGURE 2 the operation is modified by making use of two approximations which will hold in the majority of practical circumstances. The first of these is that the sign of the input of one sub-channel would normally be the same as the sign of the inputs of the other sub-channels and the second is that the signs of the inputs of the sub-channels would normally be the same as the signs of the feed back signals in those channels. Using the first of these, the Equation 1 may be rewritten:

$$G_A = 1 + k(V_{OA} \times \text{sign} V_{IA} - V_{OB} \times \text{sign} V_{IB}) \quad (2)$$

Where $V_{IB}$ is the input voltage to sub-channel B. Then using the second of these approximations Equation 2 may be rewritten:

$$G_A = 1 + k(V_{OA} \times \text{sign} V_{FA} - V_{OB} \times \text{sign} V_{FB}) \quad (3)$$

$V_{FA}$ and $V_{FB}$ being the feed back voltages in sub-channel A and B.

The system of which the circuit is shown in FIGURES 2 and 3 operates to control the gains of the various sub-channels in accordance with the Equation 3. The system is again a "rate/rate" servo system similar to that of FIGURE 1 and has three identical sub-channels A, B and C of which only the circuit of sub-channel A is shown. Fragmentary parts of the output members 25B and C of sub-channels B and C are shown linked (this is shown only diagrammatically) to the output member 25A of sub-channel A. The system is one employing modulated alternating current signals and the connections between the various blocks of the circuit are accordingly shown as pairs of leads. The linkages of the output members will include torque responsive devices as described with reference to FIGURE 1.

In FIGURE 2, sub-channel A includes a demand signal source 26A which produces in operation a rate of control surface movement demand signal. This is applied to a signal combining circuit 27A together with various feed back signals, as described below, and the output from this circuit 27A is applied to the input of the main sub-channel servo amplifier 28A. The output of the amplifier 28A is applied to a servo motor 29A for example a two phase A.C. induction motor, the reference phase of which is supplied with an alternating current voltage applied to the terminals 30A. One of the leads from the terminals 30A to the motor 29A has a current detector 31A connected in it, the function of which will be described below. The output shaft 32A of the motor 29A is connected to a tachometer generator 33A and to the input of an electro-magnetically operated clutch 34A. The output of the clutch 34A is connected to the output member 25A of the sub-channel, and its operating coil is connected in series with a contact 34A′ of a clutch relay which, as in the circuit of FIGURE 1, is actuated by a torque responsive device (not shown) in the drive from the sub-channel output member 25A to the common output.

The tachometer generator 33A is supplied with an alternating current voltage from a reference source connected across terminals 35A through a gain equaliser circuit 36A which operates to vary the voltage applied to the tachometer generator 33A in dependence upon the voltage applied to it from leads 37A. The output from the tachometer generator 33A, this being a signal representing by its magnitude the speed and by its phase the sense of rotation of the shaft 32A, is fed back to an input of the signal combining circuit 27A. It will be appreciated that for a given setting of the gain equaliser 36A the voltage generated by the tachometer generator 33A will vary approximately linearly with the speed of rotation of the shaft 32A over a given range of voltage. If the output of the gain equaliser 36A is caused to change by variation of the voltage applied to it over the leads 37A, the range of variation of the output voltage of the tachometer generator 33A will vary accordingly. By thus varying the amplitude of the rate signal fed back to the input of the sub-channel amplifier, the gain of the sub-channel is varied accordingly.

The output of the tachometer generator is also fed to a sign (phase) sensor circuit 38A (this will have to be a phase sensor since modulated A.C. signals are employed) the output of which is applied to a multiplier generator circuit 39A another input of which is coupled to the output of the amplifier 28A. The circuit 39A serves to generate across the leads 40A a D.C. voltage the magnitude of which represents the magnitude and phase (sign) of the output voltage from the amplifier 28A multiplied by plus or minus one dependent upon the phase (sign) of the output from the tachometer generator 33A.

The input leads 37A of the gain equaliser 36A and the output leads 40A of the multiplier generator circuit 39A are connected in a star delta network with the identical leads from sub-channels B and C, this network being shown in somewhat clearer form in FIGURE 3 of the drawing which shows the multiplier generators 39 and gain equalisers 36 together with the output connections of the former and the input connections of the latter. Some of these connections are shown in FIGURE 2 as well, the manner in which the connections shown fit into FIGURE 3 being indicated by the arrows on FIGURE 2 showing the points on FIGURE 3 to which the leads are connected.

Turning now to FIGURE 3, one of the output leads 40A of multiplier generator 39A is connected to the centre terminal TS of the star network the other being connected to one fixed contact of a change-over relay contact 41A (see also FIGURE 2). The contact 41A is controlled either directly or indirectly by the clutch relay of sub-channel A and the moving contact makes contact with the fixed contact to which the lead 40A is connected when the relay is in the condition such that the clutch 34A is energised. The other fixed contact of contact 41A is connected to one of the input leads 37A of the gain equaliser 36A. That same one of the leads 37A is connected to a terminal TAB which is common to sub-channels A and B. The other of the leads 37A is connected to one end of a resistor 42A (see also FIGURE 2), the other end of which is connected both to the moving contact of contact 41A and to a terminal TCA which is common to sub-channels A and C. The parts of the circuit of FIGURE 3 belonging to sub-channels B and C are identical, the circuit being appropriately sub-divided in FIGURE 3 by dotted lines.

As long as all the clutches 34 are energised and the contacts 41 are in the positons other than those shown in FIGURE 3, it can be seen that each of the series combinations of a gain equaliser 36 and a resistor 42 has applied across it a voltage equal to the difference between the outputs of the multiplier generator circuits of the sub-channel to which it belongs and the next sub-channel taken in a pre-determined cyclic order of the sub-channels. For example, equaliser 36A has applied to it a voltage dependent on the difference between the outputs of the multiplier generator circuits 39A and 39B. Should any one of the sub-channels be put out of action by operation of the clutch relay to open the contact 34′, the contact 41 of that sub-channel will revert to the position shown in FIGURE 3. In, for example, sub-channel A this will result in a direct connection between terminals TAB and TCA which will short circuit the combination of gain equaliser 36A and resistor 42A and disconnect the multiplier generator circuit 39A. The circuit can then continue to operate for the two remaining sub-channels B and C with each equaliser 36B and 36C controlled in accordance with the difference between the outputs of the multiplier generator circuits 39B and 39C used in the required sense.

Additionally the output of the amplifier 28A is applied to an output power detector 45A the output of which is applied to a dead servo relay 46A. The relay 46A remains energised as long as the power output of the amplifier 28A is maintained above predetermined level. If it falls below that level the relay 46A is release and a contact of that relay is arranged to actuate the clutch relay which disengaged the clutch 34A. By this means the sub-channel A is put out of action if the output from the amplifier falls below a predetermined safe level, thus protecting the system against a fault giving rise to no output or only a small output from the amplifier 28A. Similarly, the current detector 31A operates to actuate the clutch relay to disengage the clutch 34A if the current flowing in the reference phase winding of the motor is less than a predetermined value.

As with the circuit shown in FIGURE 1 datum balancing circuits are also provided. For this purpose an output from the amplifier 28A is applied to an output detector 47A which is supplied with a reference voltage from terminals 48A and produces a D.C. voltage proportional to the output voltage from the amplifier 28A. The output leads 49A of the detector 47A are connected together with the inputs in parallel to a limiter 50A and an integrator 51A in a further star delta network similar to that shown in FIGURE 3. This network is not shown completely in FIGURE 2, only that part belonging to sub-channel A being shown, the further network being connected to the terminals 52A in the same manner that the network of FIGURE 3 is connected to the set of three terminals shown in FIGURE 2. The further network is identical with FIGURE 3, except that the output detectors 47 replace the generators 39 and the inputs of limiters 50 and integrators 51 in parallel replace the equalisers 36. The network includes resistors 53 and contacts 54 (53A and 54A are shown in FIGURE 2) corresponding to resistors 42 and contacts 41 in FIGURE 3.

The outputs of the limiter 50A and the integrator 51A are, as in the circuit of FIGURE 1, applied to inputs of the signal combining circuit 27A. In addition, as before, to prevent all three sub-channels drifting simultaneously in an identical manner an output from the demand signal source 26A is fed to a second input of the integrator 51A.

In the circuit shown in FIGURE 3, the gain equalisers are assumed to be current sensitive devices. Should voltage sensitive devices be provided, the resistors 42 can be omitted.

FIGURES 4 and 4*a* show an example of circuits which may be employed for the sign sensor circuits 38 and multiplier generators 39. The circuit consists of an amplifier 60 the input terminals 61 of which are connected across the output from one of the tachometer generators 33. The output of the amplifier 60 is applied to the primary winding of a transformer 62, the secondary winding of which is connected in a balanced transistor switching network 63. The amplifier 60 may for example be a two stage transistor amplifier producing an output such that in the network 63 the two transistors 64 are rendered conducting and non-conducting in alternate half cycles, one being conducting whilst the other is non-conducting. Current thus flows in each half of the primary winding of transformer 65 in opposite half cycles and the two signalling conditions constituting the output of the sign sensor circuit are whether, with respect to the reference A.C. voltage applied to terminals 35A (FIGURE 2), the current flows in a particular half of the primary winding of transformer 65 in the positive or the negative half cycles of the reference voltage.

The operating voltage for the switching network 63 is an unsmoothed output from a full wave rectifier 66 supplied with an A.C. voltage at terminals 67 which is of the same frequency as that employed throughout the circuits of FIGURE 2.

The secondary windings of transformer 65 are connected in a conventional bridge rectifier network 73, the input terminals 68 and 68' of which are connected to the three terminals 69 (see FIGURE 4*a*) of a centre-tapped secondary winding 70 of an output transformer 71 forming part of the servo amplifier 28 concerned. As shown in FIGURE 4*a*, the transformer 71 has a second secondary winding 72 which is connected to the control phase winding of the associated servo motor 29 (not shown in FIGURE 4*a*). The terminal 68' is connected to the centre terminal 69 of winding 70 and the other terminals 68 are connected to the two end ones of terminals 69.

The amplifier 28 produces in operation an amplitude modulated A.C. output which is of the same frequency as the other A.C. signals referred to in this description of FIGURES 4 and 4*a* and is derived from the same A.C. reference source which is connected to terminals 35A, so as to be either in phase or in antiphase, depending on the sign of the modulation signal, with the reference voltage. In known manner, network 73 demodulates the voltage applied to it at terminals 68 and produces at its output terminals 74 a D.C. voltage dependent on the modulation of the output of amplifier 28. The sense of the voltage at terminals 74 is determined by the phase of the voltage applied to input terminals 61 for a modulation signal of a given sign, the sense reversing as the phase reverses. Thus the voltage produced at terminals 74 depends in magnitude on the magnitude of the output of the output of the amplifier 28 and its sense depends on the phase (sign) of the output of the tachometer generator 33.

The gain equalisers 36 may simply be magnetic amplifiers each producing an A.C. output voltage varying in magnitude with the D.C. voltage applied to its input, the A.C. voltage being appropriately phased and subtracted from the reference voltage applied to terminals 35, so as to produce a varying voltage for application to the tachometer generator 33 concerned.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A servo system of the kind in which a plurality of independent sub-channels are arranged to actuate a common output in dependence upon a common demand quantity, the system comprising at least three sub-channels each including an amplifier, means for applying a signal representing the common demand quantity to the amplifier, a servo motor energised by the amplifier, at least one feed back signal source driven by the servo motor, a feed back channel for applying the output of the feed back signal source to the amplifier, means coupling the motor to actuate the common output, a source of signals representing the difference between the outputs of the amplifiers of both the sub-channel in which the source is included and the next one in a predetermined cyclic order of all the sub-channels which cyclic order is the same for the different sub-channels, means for varying the transmission charcteristics of the sub-channel in response to an applied signal, means for applying the output of the difference signal source to said varying means to vary said characteristics to reduce the discrepancy towards zero and means for preventing a simultaneous drift of the outputs of all the sub-channel amplifiers together in the same manner.

2. A servo system according to claim 1 in which said means for varying the transmission characteristics of a sub-channel comprises means for varying the gain in response to an applied signal.

3. A servo system according to claim 2 in which said means for varying the gain of a sub-channel comprises means for varying the gain of the amplifier.

4. A servo system according to claim 2 in which said means for varying the gain of a sub-channel comprises means for varying the gain of said feed back channel.

5. A servo system according to claim 2 in which said means for varying the gain of a sub-channel comprises means for varying the sensitivity of said feedback signal source.

6. A servo system according to claim 1 in which said means for varying the transmission characteristics of a sub-channel comprises means for feeding back to the amplifier at least one signal derived from said discrepancy signal.

7. A servo system according to claim 6 in which said feed back means has a first channel including an integrator, means for feeding the discrepancy signal to the integrator and means for feeding the output of the integrator to the amplifier.

8. A servo system according to claim 7 in which said feed back means has a further channel including a limiter, means for feeding the discrepancy signal to the limiter and means for feeding the output of the limiter to the amplifier.

9. A servo system according to claim 6 in which said feed back means has a channel including a limiter, means for feeding the discrepancy signal to the limiter and means for feeding the output of the limiter to the amplifier.

10. A servo system according to claim 2 in which said means for varying the transmission characterlistics of a sub-channel further comprises means for feeding back to the amplifier at least one signal derived from said discrepancy signal.

11. A servo system according to claim 10 in which said feed back means has a first channel including an integrator, means for feeding the discrepancy signal to the integrator and means for feeding the output of the integrator to the amplifier.

12. A servo system according to claim 11 in which said feed back means has a further channel including a limiter, means for feeding the discrepancy signal to the limiter and means for feeding the output of the limiter to the amplifier.

13. A servo system according to claim 10 in which said feed back means has a channel including a limiter, means for feeding the discrepancy signal to the limiter and means for feeding the output of the limiter to the amplifier.

14. A servo system according to claim 1 in which said means for preventing a simultaneously drift in all the sub-channels comprises, in each sub-channel, and integrator means for feeding at least a component of the demand signal to the integrator, and means for feeding the output of the integrator to the amplifier.

15. A servo system of the kind in which a plurality of independent sub-channels are arranged to actuate a common output in dependence upon a common demand quantity, the system comprising at least three sub-channels each including an amplifier, means for applying a signal representing the common demand quantity to the amplifier, a servo motor energised by the amplifier, at least one feed back signal source driven by the servo motor, a feed back channel for applying the output of the feed back signal source to the amplifier, means coupling the motor to actuate the common output, a comparator for generating an output signal representing the difference of two input signals, means for feeding the output of the amplifier to the comparator as one input signal, means for feeding the output of the amplifier of the next one of the sub-channels to the comparator as a second input signal, the next sub-channel being the next one in a predetermined cyclic order of the sub-channels, means for varying the gain of the sub-channel in response to an applied signal, means for feeding the output of the comparator to the gain varying means to vary the sub-channel gain in the sense required to reduce said difference towards zero, and means for preventing a simultaneous drift of the outputs of all the sub-channel amplifiers together in the same manner.

16. A servo system according to claim 15 which further includes an additional feed back channel for feeding back signals to the amplifier and means for applying the output of the comparator to the feed back channel in the sense required to reduce said difference towards zero.

17. A servo system according to claim 16 in which said feed back channel includes an integrator.

18. A servo system according to claim 17 in which said feed back channel includes a limiter in parallel with said integrator.

19. A servo system of the kind in which a plurality of independent sub-channels are arranged to actuate a common output in dependence upon a common demand quantity, the system comprising three sub-channels each including an amplifier, means for applying a signal representing the common demand quantity to the amplifier, a servo motor energised by the amplifier, at least one feed back signal source driven by the servo motor, a feed back channel for applying the output of the feed back signal source to the amplifier, means coupling the motor to actuate the common output, means for varying the grain of the sub-channel in response to an applied signal and means for preventing a simultaneous drift of the outputs of all the sub-channel amplifiers together in the same manner, the system further comprising a star delta network common to all three sub-channels, the network having a centre point and three apex points, three star arms connected one between each of the apex points and the centre point and three delta arms connected one between each pair of apex points, three signal generators one from each sub-channel and coupled one in each star arm which signal generators are arranged to generate a signal dependent on the product of the output of the amplifier in the sub-channel concerned and the sign of the signal in the feed back channel of the same sub-channel, and means coupling the gain varying means in each sub-channel into a respective one of the delta arms, the gain varying means of a particular sub-channel being connected in the delta arm interconnecting the two apex points to which are connected the star arms having coupled to them the signal generator of that particular sub-channel and of the next sub-channel in a predetermined cyclic order of the sub-channels.

20. A servo system according to claim 19 which further includes a second star delta network common to all three sub-channels, the network having a centre point and three apex points, three star arms connected one between each of the apex points and the centre point and three delta arms connected one between each pair of apex points, three signal generators one from each sub-channel and coupled one in each star arm which signal generators are arranged to generate a signal dependent on the output of the amplifier concerned, an additional feed back channel in each sub-channel having an output coupled to the amplifier and an input and means coupling the additional feed back channel input into a respective one of the delta arms of the second star delta network, said input in a particular sub-channel being connected in the delta arm interconnecting the two apex points to which are connected the star arms having coupled to them the signal generator of that particular sub-channel and of the next sub-channel in a predetermined cyclic order of the sub-channels.

21. A servo system according to claim 20 in which said additional feed back channel includes an integrator.

22. A servo system according to claim 21 in which said additional feed back channel includes a limiter in parallel with said integrator.

References Cited by the Examiner

UNITED STATES PATENTS 3,054,039 9/62 Meredith ---------------- 318—19

JOHN F. COUCH, *Primary Examiner.*